United States Patent
Ari

(10) Patent No.: US 7,418,539 B2
(45) Date of Patent: Aug. 26, 2008

(54) SYSTEM AND METHOD FOR UTILIZING AN EXTERNAL COMPUTING DEVICE TO ACCESS STORAGE INSIDE AN INACTIVE COMPUTING DEVICE

(75) Inventor: Ismail Ari, Hayward, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 89 days.

(21) Appl. No.: 11/268,272

(22) Filed: Nov. 4, 2005

(65) Prior Publication Data

US 2007/0106830 A1    May 10, 2007

(51) Int. Cl.
*G06F 13/36* (2006.01)
(52) U.S. Cl. .............. 710/316; 710/315; 710/38; 710/64; 709/216
(58) Field of Classification Search ......... 710/300–317, 710/62–64, 72, 8–19, 31–38, 107–110; 709/311–312, 709/328–330; 711/146–153; 713/1–2
See application file for complete search history.

(56) References Cited

U.S. PATENT DOCUMENTS

| | | | | |
|---|---|---|---|---|
| 5,740,386 A | * | 4/1998 | Miller et al. | 710/306 |
| 6,735,663 B2 | * | 5/2004 | Watts et al. | 710/313 |
| 6,801,974 B1 | * | 10/2004 | Watts et al. | 710/303 |
| 6,928,542 B2 | * | 8/2005 | Wen et al. | 713/2 |
| 6,954,804 B2 | * | 10/2005 | Lam et al. | 710/14 |
| 7,054,981 B2 | * | 5/2006 | Fadell et al. | 710/305 |
| 7,143,201 B2 | * | 11/2006 | Watanuki | 710/11 |
| 2005/0060490 A1 | * | 3/2005 | Lu | 711/115 |
| 2006/0174043 A1 | * | 8/2006 | Oh | 710/105 |

* cited by examiner

*Primary Examiner*—Raymond N Phan

(57) ABSTRACT

Apparatus, systems, and methods for enabling a user to access internal storage in the computing device when the computing device is inactive are disclosed. The computing devices include a primary bus and a secondary bus to access an internal storage device in the computing device, and a bus switch capable of detecting if the computing device is inactive connected to the primary bus and the secondary bus. When the computing device becomes inactive (e.g., is malfunctioning, lacks sufficient power, and is switched off), the bus switch switches access to the internal storage device from being via the primary bus to being via the secondary bus. As such, an external computing device is capable of accessing data in the computing device relatively easily when the computing device is inactive.

20 Claims, 4 Drawing Sheets

SYSTEM AND METHOD FOR UTILIZING AN EXTERNAL COMPUTING DEVICE TO ACCESS STORAGE INSIDE AN INACTIVE COMPUTING DEVICE

FIELD OF THE INVENTION

The invention generally relates to computing devices, and particularly to, computing devices including a secondary bus for allowing access to data in internal storage devices in the computing devices when the computing devices are inactive.

BACKGROUND OF THE INVENTION

Computing devices (e.g., personal computer, laptop computer, cellular telephone, pager, personal digital assistant (PDA), BlackBerry, Palm Pilot, MP3 player, and the like) sometimes malfunction (e.g., crash, break, hang, freeze, and the like). Furthermore, portable computing devices require a power source (e.g., a battery) that sometimes becomes completely discharged (e.g., through use) rendering portable computing devices at least temporarily inoperable if users do not have a replacement battery or other type of power source (e.g., an electrical cord). In situations where computing devices have malfunctioned or are otherwise inoperable because they are unable to receive sufficient power, access to data stored in the internal storage of these computing devices is generally unavailable.

Prior apparatus, systems and methods for retrieving data from malfunctioning or devices that are not receiving sufficient power require that the internal storage devices be removed from the computing devices and be connected to a special device that can extract the data from the removed internal storage devices to make data available while the computing device is being repaired, replaced, or the battery is being charged. This process typically requires skill and knowledge beyond the capabilities of the average user. As such, when computing devices malfunction, average users are required to take their computing devices to a technician to extract the data from the internal storage devices, which can be expensive and/or inconvenient. In addition, in situations where portable computing devices temporarily lack sufficient power to operate, most users are unable to extract data saved in their portable computing devices until the batteries are recharged, replacement batteries are utilized, or the portable computing devices are otherwise able to receive sufficient power (e.g., by utilizing electrical outlets via electrical cords) to operate, which may be troubling if such means are unavailable. Thus, there is a need for apparatus, systems and methods that enable users to easily access internal storage stored in their computing devices when the computing devices malfunction or are not receiving sufficient power to operate. In other words, users need the ability to easily access data in computing devices when the computing devices are inactive.

SUMMARY OF THE INVENTION

The present invention includes apparatus, systems and methods for enabling users to access data stored in an internal storage device of a computing device when the computing device is inactive (e.g., are malfunctioning, lack sufficient power, and the like). Apparatus and systems, in accordance with various exemplary embodiments of the invention, include a computing device having a bus switch connected to a primary bus and a secondary bus, wherein both the primary bus and the secondary bus are capable of accessing data in the internal storage device of the computing device. The bus switch is configured to detect if the computing device is inactive, and switch from the primary bus to the secondary bus to access data in the internal storage device when the bus switch detects the computing device is inactive. Similarly, methods to retrieve data from an inactive computing device, in accordance with various exemplary embodiments of the invention, include the steps of determining, by the bus switch, if the computing device is inactive, and switching from the primary bus to the secondary bus to retrieve data from the internal storage device of the computing device when the bus switch determines the computing device is inactive.

BRIEF DESCRIPTION OF THE DRAWINGS

Additional aspects of the present invention will become evident upon reviewing the embodiments described in the specification and the claims taken in conjunction with the accompanying figures, wherein like numerals designate like elements, and wherein:

DETAILED DESCRIPTION

Figure 1:
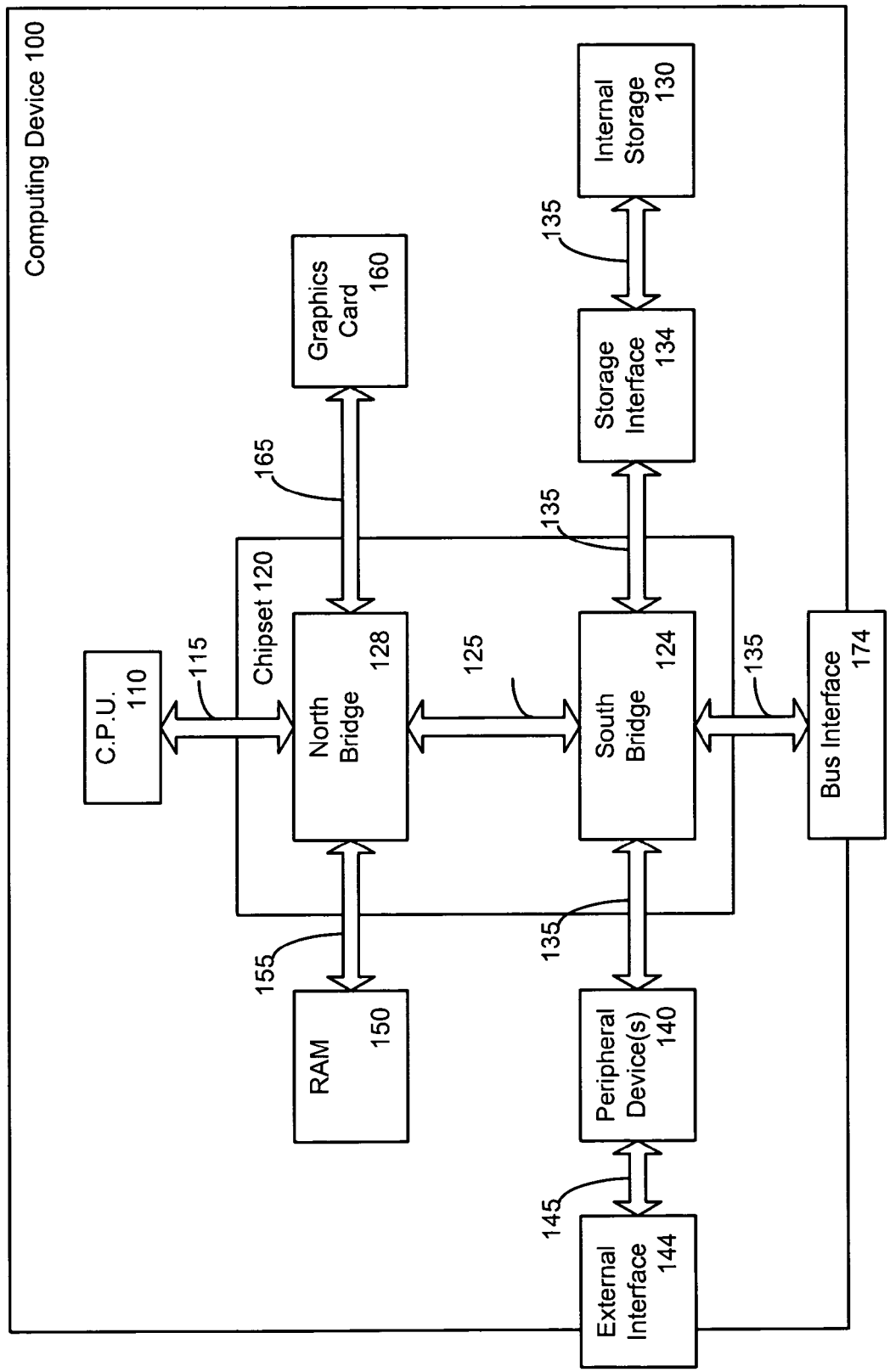
FIG. 1 is a block diagram of a prior art computing device.

FIG. 1 is a block diagram of a current computing device 100. Examples of computing device 100 include, but are not limited to, a personal computer, a laptop computer, a cellular telephone, a pager, a personal digital assistant (PDA), a BlackBerry; a Palm Pilot, an MP3 player, and the like.

Computing device 100 includes a central processing unit (CPU) 110 connected to and in communication with a chipset 120 via a local bus 115. CPU 110 is typically hardware and/or software configured to extract instructions from memory, and decode and execute the instructions by performing arithmetic and logical operations. Suitable examples of CPU 110 include central processing units manufactured by Intel Corporation of Santa Clara, Calif. and Advanced Micro Devices (AMD) of Austin, Tex. Local bus 115 is usually hardware and/or software configured to facilitate communication between CPU 110 and chipset 120. Chipset 120 is typically hardware and/or software configured to control the flow of data between CPU 110 and the other components of computing device 100. Examples, of chipset 120 include substantially any chipset manufactured by Intel Corporation and/or AMD.

Often, chipset 120 includes a south bridge 124 connected to and in communication with a north bridge 128 via a bus 125. South bridge 124 is also known in the art as an input/output (I/O) controller, and may also be manufactured by Intel Corporation and/or AMD. South bridge 124 typically is utilized to control "on-board devices" (e.g., an internal storage 130), one or more I/O devices (e.g., a peripheral device 140), communicate with external devices via a bus interface (e.g., bus interface 174), and exchange data with north bridge 128. Bus 125 is usually hardware and/or software configured to transfer data between south bridge 124 and north bridge 128. Notably, bus 125 is often a dedicated bus for communication between south bridge 124 and north bridge 128.

Internal storage 130 is utilized to permanently store data (i.e., store data when computing device 100 is switched off), and includes disks (e.g., hard, floppy, optical, and the like), non-volatile memory cards, CD/DVD drives, tapes, and the like. A storage interface 134 is utilized to convert data being written into and/or read from internal storage 130 so that it is stored and/or accessed in the proper format. South bridge 124 and internal storage 130 are often connected to and in communication with each other via a bus 135 (e.g., a peripheral component interconnect (PCI) bus). Current PCI buses also include PCI-Express and PCI-X, including their various versions.

As discussed above, south bridge 124 also typically controls and communicates with at least one internal peripheral device 140 via bus 135. Examples of internal peripheral devices include, but are not limited to, a compact disk-read only memory (CD-ROM) drive, a compact disk-read (CD-R) drive, an internal modem, and the like. Internal peripheral device 140 is generally connected to and in communication with an external interface 144 via a bus 145 to enable external devices to be utilized with computing device 100. External interface 144 is typically a serial, parallel, or similar type of interface.

South bridge 124 is connected to and in communication with bus interface 174 via bus 135. Bus interface 174 is hardware and/or software suitably configured to enable computing device 100 to be connected to and in communication with an external computing device (not shown). Bus interface 174 may be a USB port, a FireWire port, a Personal Computer Memory Card International Association (PCMCIA) port, or the like. Furthermore, bus interface 174 may facilitate wireless connection between computing device 100 and the external device.

North bridge 128 is typically configured to control the flow of data between CPU 110, south bridge 124, and other devices (e.g., a random access memory (RAM) 150, a graphics card 160, and the like) in computing device 100. Notably, RAM 150 may also include dynamic random access memory (DRAM) synchronous dynamic random access memory (SDRAM), or other types of memory known in the art. North bridge 128 and RAM 150 are typically connected and in communication with each other via a memory bus 155.

Graphics card 160 is generally a printed circuit board that provides added graphics capabilities to computing device 100. Graphics card 160 may be connected to north bridge 128 via a bus 165. Notably, some computing devices include an accelerated graphics port (AGP) for connecting and facilitating communication between graphics card 160 and north bridge 128.

Reference will now be made to various exemplary embodiments of the invention, which are illustrated in the accompanying figures. While these exemplary embodiments are described in sufficient detail to enable those skilled in the art to practice the invention, it should be understood that other embodiments may be realized and that logical and/or mechanical changes may be made without departing from the spirit and scope of the invention. Thus, the various embodiments herein are presented for purposes of illustration and not by way of limitation. For example, the steps recited in any of the method or process descriptions may be executed in any order and are not limited to the order presented. Moreover, any of the functions or steps may be outsourced to or performed by one or more third parties.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical connections between the various elements. It should be noted that many alternative and/or additional functional relationships or physical connections may be present in a practical system.

Embodiments of the present invention provide apparatus, systems, and methods for enabling users to access storage inside computing devices when the computing devices are inactive in a relatively simple manner. As such, the present invention enables users to access storage inside computing devices when they would otherwise be unable to access the data, and possibly with less expense.

Figure 2:
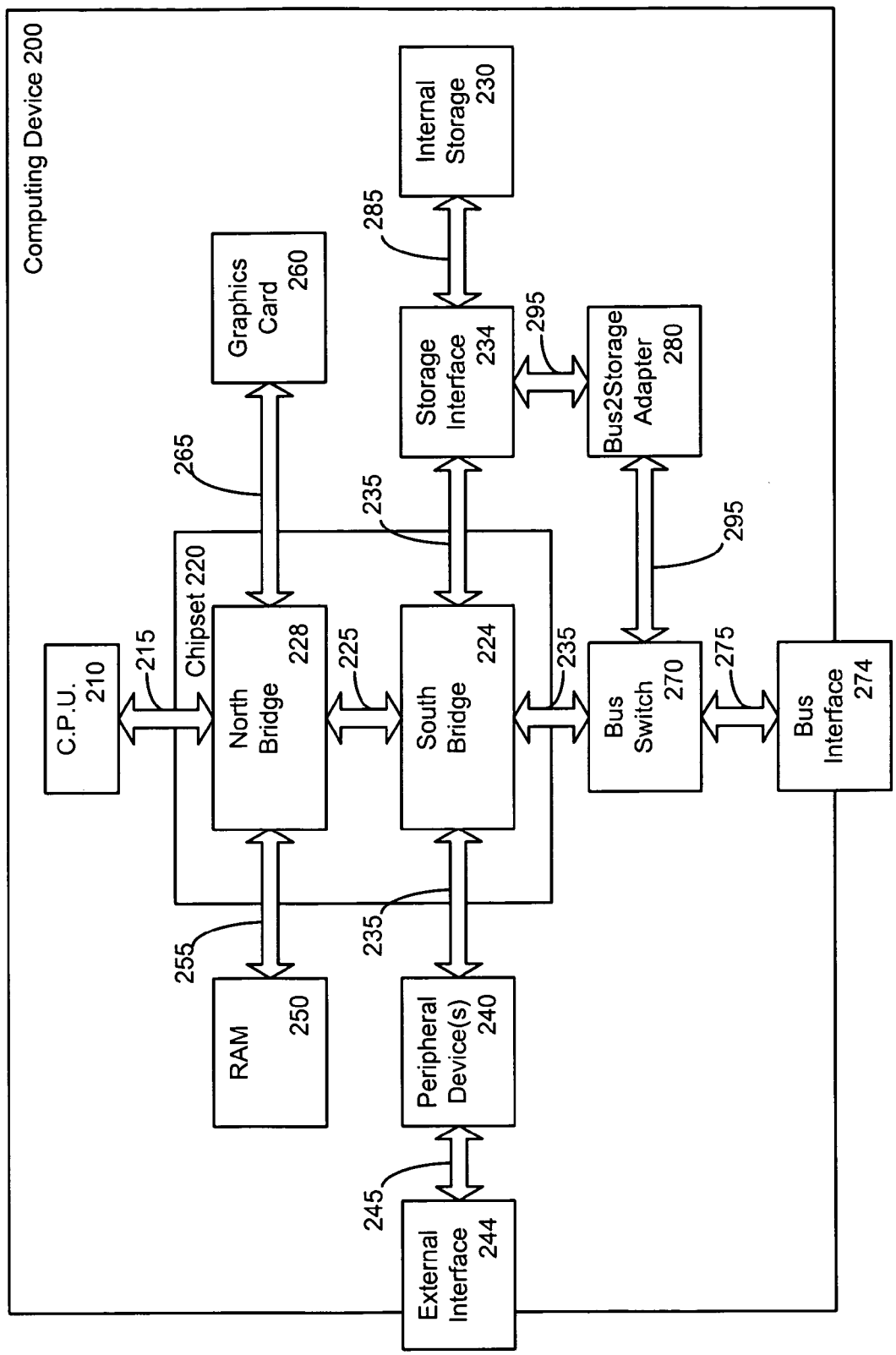
FIG. 2 is a block diagram of a computing device to enable a user to access data in an internal storage device in the computing device when the computing device is inactive in accordance with one exemplary embodiment of the invention.

Returning now to the figures, FIG. 2 is a block diagram of one exemplary embodiment of a computing device 200 to enable a user to access an internal storage 230 in computing device 200 when computing device 200 is inactive in accordance with the present invention. Various embodiments of the present invention include a CPU 210 connected to and in communication with a chipset 220 (including a south bridge 224 connected to and in communication with a north bridge 228 via a dedicated bus 225) via a local bus 215 similar to CPU 110, connected to and in communication with chipset 120 (including south bridge 124 connected to and in communication with a north bridge 128 via dedicated bus 125) via local bus 115, respectively, discussed above.

In addition, computing device 200, in various exemplary embodiments, includes north bridge 228 connected to and in communication with RAM 250 via a memory bus 255, and connected to and in communication with a graphics card 260 via bus 265 (or an AGP) similar to north bridge 128 connected to and in communication with RAM 150 via memory bus 155, and connected to and in communication with graphics card 160 via bus 165, respectively, discussed above. Furthermore, computing device 200 includes a south bridge 228 connected to and in communication with one or more internal peripheral devices 240 via a bus 235, with peripheral device 240 connected to and in communication with an external interface 244 via a bus 245 similar to south bridge 128 connected to and in communication with one or more internal peripheral devices 140 via a bus 135, with peripheral device 140 connected to and in communication with external interface 144 via bus 145, respectively, discussed above.

In accordance with one exemplary embodiment, computing device 200 includes south bridge 224 connected to and in communication with a storage interface 234 via bus 235 similar to south bridge 124 connected to and in communication with storage interface 134 via bus 135, respectively, discussed above. Furthermore, storage interface 234 is connected to and in communication with an internal storage 230 via a bus 285, wherein internal storage 230 is similar to internal storage 130 discussed above.

Bus 285 may be any hardware and/or software suitably configured to facilitate transmission of data to and/or from internal storage 230. As such, bus 285 may be any bus known in the art or developed in the future. Examples of bus 285 include, but are not limited to USB, FireWire, PCMCIA, PCI, PCI-Express, PCI-X, and the like. Moreover, in accordance with one exemplary embodiment, bus 285 is a dedicated bus between internal storage 230 and storage interface 234.

Computing device 200, in accordance with another exemplary embodiment of the invention, includes a bus switch 270 connected to and in communication with south bridge 224 via bus 235, and connected to and in communication with a bus interface 274 via a bus 275. Bus switch 270 may be any hardware and/or software suitably configured to detect (via south bridge 224) if computing device 200 includes sufficient power to operate and switch access to internal storage 230 from being via bus 235, storage interface 234, and bus 285 to via bus 275, bus switch 270, bus 295, Bus2Storage adapter 280, bus 295, storage interface 234, and bus 285 when computing device 200 does not include sufficient power to operate. As such, bus switch 270 may be any switch known in the art or developed in the future capable of performing these functions.

Bus interface 274 may be any hardware and/or software suitably configured to enable computing device 200 to be connected to and in communication with an external computing device (not shown). As such, bus interface may be any bus interface known in the art or developed in the future. In accordance with various exemplary embodiments of the invention, bus interface 274 is a USB port, a FireWire port, a Personal Computer Memory Card International Association (PCMCIA) port, or the like. Notably, the invention contemplates that bus interface 274 may facilitate wireless connection between computing device 200 and the external device. Moreover, the invention contemplates that the external computing device may include embodiments of the present invention, but does not require such. As such, the external computing device may be any computing device known in the art or developed in the future.

In accordance with an exemplary embodiment of the invention, bus switch 270 is connected to and in communication with a Bus2Storage adapter 280 via bus 295, wherein examples of Bus2Storage adapter 280 include, but are not limited to, a USB to Intelligent Drive Electronics (USB2IDE) adapter, a FireWire2IDE adapter, a PCMCIA to Serial Advanced Technology Attachment (PCMCIA2SATA) adapter, a USB2SATA, and the like. Notably, the invention contemplates that Bus2Storage adapter 280 may be any adapter known in the art capable of transferring IDE or SATA protocol commands and data between computing device 200 and an external computing device (discussed below) over USB, FireWire, or PCMCIA buses.

Bus2Storage adapter 280, in one embodiment, is also connected to and in communication with storage interface 234 such that a path from bus interface 274 to internal storage 230 is established. In other words, an external computing device connected to bus interface 274 is able to access data stored in internal storage 230 via the path established by bus 275, bus switch 270, bus 295, Bus2Storage adapter 280, storage interface 234, and bus 285 when computing device 200 is inactive.

In accordance with one exemplary embodiment of the invention, the path to internal storage 230 established by south bridge 224, bus 235, storage interface 234, and bus 285 is a primary path utilized when computing device 200 is active. In accordance with another exemplary embodiment of the invention, the path established by bus 275, bus switch 270, bus 295, Bus2Storage adapter 280, bus 295, storage interface 234, and bus 285 is a secondary path utilized when computing device 200 is inactive.

In operation, computing device 200 operates similar to computing device 100 when computing device 200 is actively operating. In other words, bus 235 (between south bridge 224 and storage interface 234) is utilized to access data stored in internal storage 230 when computing device 200 is active. However, when computing device 200 becomes inactive (e.g., through a malfunction, lack of power (e.g., the battery is substantially discharged), is switched off, and the like), an external computing device may be connected to computing device 200 via bus interface 274. At this time, power may be supplied to bus switch 270 such that bus switch 270 is capable of determining that computing device 200 is inactive. When bus switch 270 determines computing device 200 is inactive, bus switch 270 switches access to internal storage 230 (via storage interface 234 and bus 285) from being via bus 235 (between south bridge 224 and storage interface 234) to via bus 275 bus switch 270, bus 295, Bus2Storage adapter 280, and bus 295. In this manner, the external computing device is capable of supplying power to internal storage 230 and reading from and/or writing to internal storage 230. As such, the data stored in internal storage is accessible by, for example, plugging a USB, FireWire, PCMCIA, and similar plugs from an external computing device into bus interface 274.

Systems in accordance with the present invention allow data stored in an inactive computing device to be relatively easily accessed by an external computing device. As such, when a computing device becomes inactive, the user can use, for example, a USB plug, a FireWire plug, a PCMCIA plug, or similar plug from the external computing device to provide power to the internal storage of the inactive device such that the data stored in the internal storage can be retrieved by the external computing device.

Figure 3:
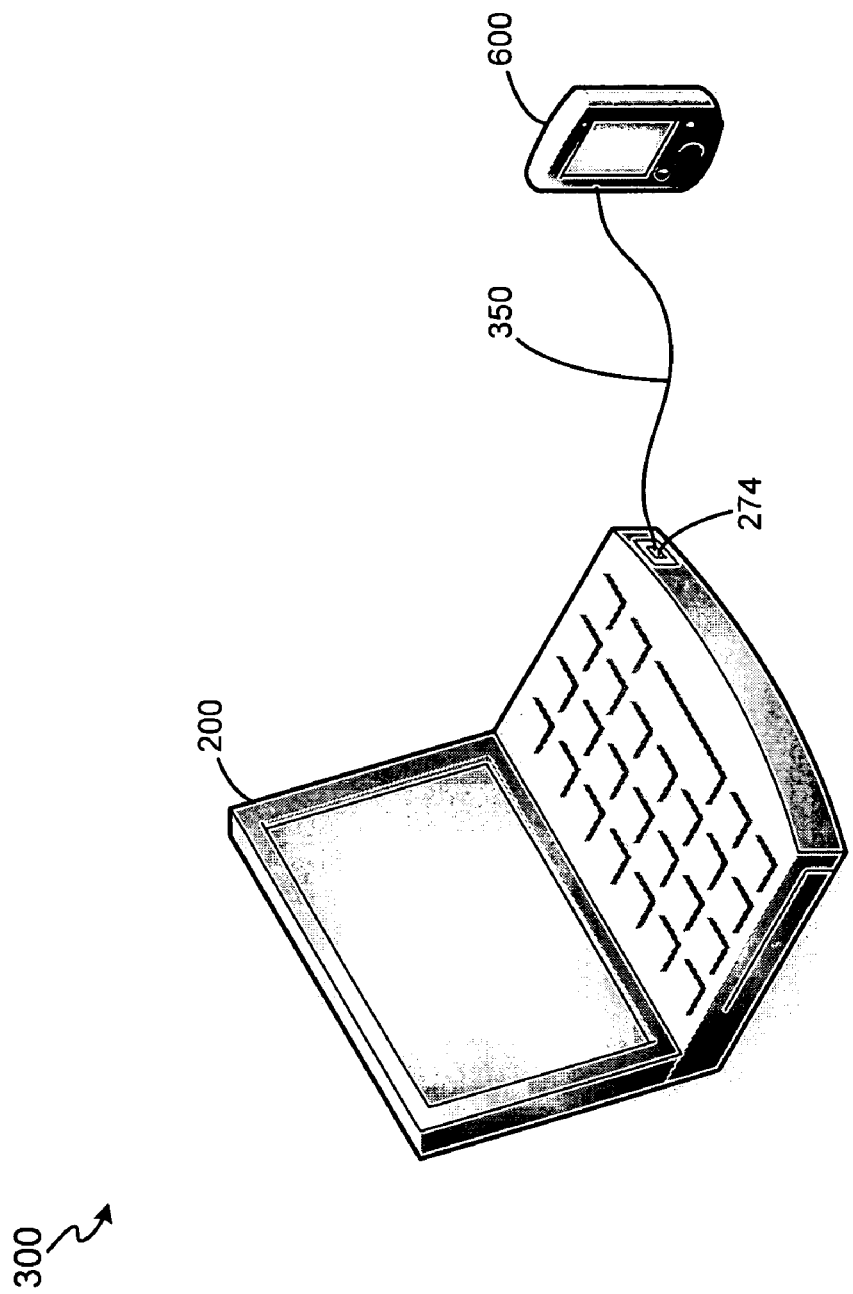
FIG. 3 is a diagram of a system to enable a user to access data in an internal storage device in a computing device when the computing device is inactive in accordance with an exemplary embodiment of the invention.

FIG. 3 is a diagram of a system 300 to enable a user to access memory in a computing device (e.g., computing device 200) when the computing device is inactive in accordance with an exemplary embodiment of the invention. In one exemplary embodiment, system 300 includes computing device 200 connected to and in communication with an external computing device 600 via a plug 350.

In the embodiment illustrated in FIG. 3, computing device 200 is a laptop computer and external computing device 600 is a PDA. However, computing device 200 and external computing device 600 could also be any of a personal computer, a cellular telephone, a pager, a BlackBerry, a Palm Pilot, an MP3 player, and the like, respectively. Notably, although FIG. 3 illustrates that computing device 200 and external device 600 are different types of computing devices, the invention contemplates that computing device 200 and external computing device 600 may be the same type of computing device. Thus, when computing device 200 becomes inactive, the user can connect plug 350 with bus interface 274 of computing device 200 such that external computing device 600 can provide power to and retrieve data stored in internal storage 230 (not shown).

Notably, when a peripheral device (e.g., USB devices) is normally connected to computing device 200, computing device 200 is generally referred to as a "master" device and the peripheral device is referred to as a "slave" device. This situation is often called a host computer to peripheral device system. In system 300, since computing device 200 is inactive, computing device 200 may be the "slave" device and external computing device 600 may be the "master" device. As such, system 300 may be referred to as a peer (i.e. external computing device 600) to host (i.e., computing device 200) system.

Figure 4:
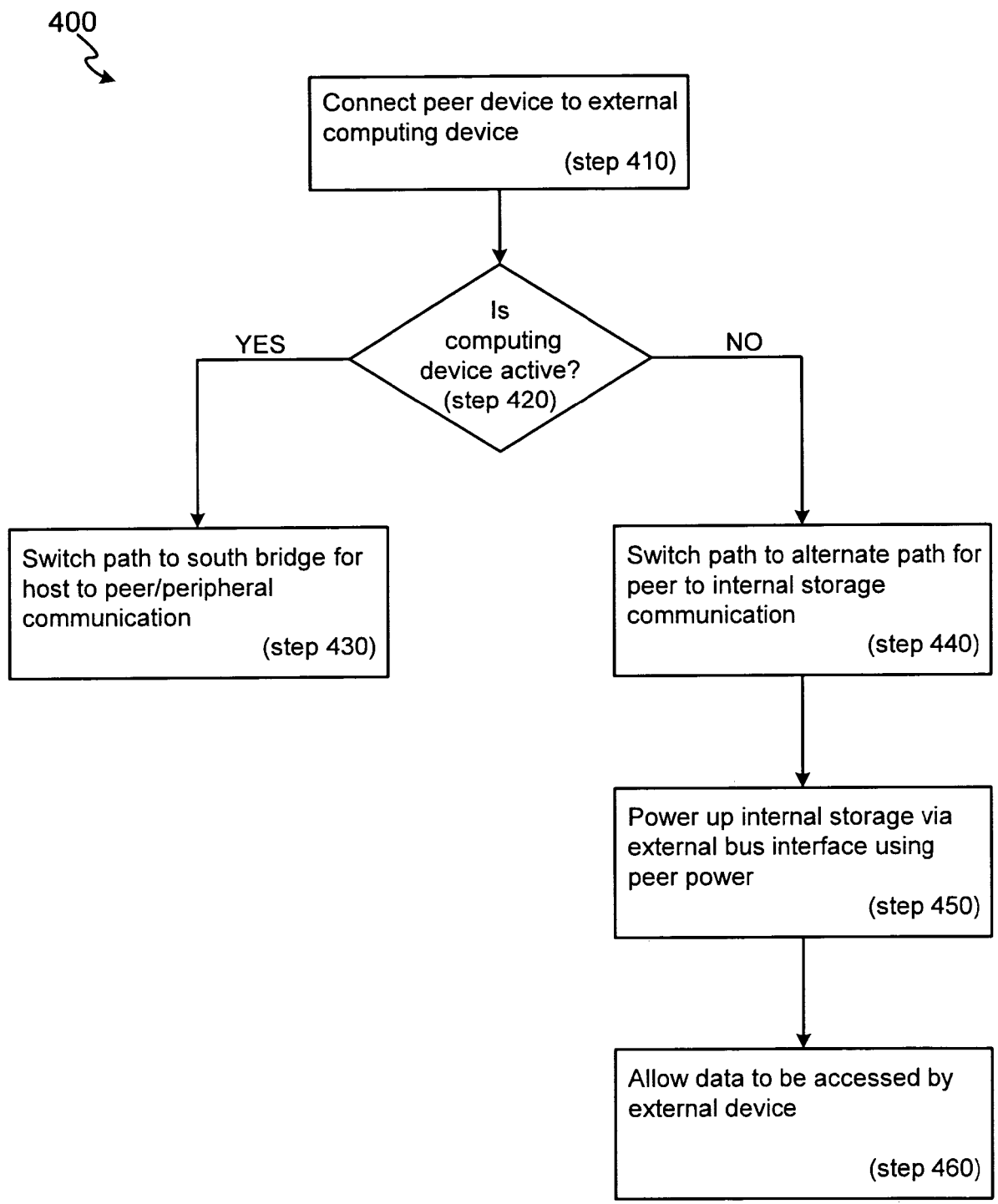
FIG. 4 is a flow diagram of a method to enable a user to access data in an internal storage device in a computing device when the computing device is inactive in accordance with another exemplary embodiment of the invention.

FIG. 4 is a flow diagram of a method 400 to enable a user to access memory in a computing device (e.g., computing device 200) when computing device 200 is inactive in accordance with another exemplary embodiment of the invention. Method 400, in one exemplary embodiment, initiates by connecting computing device 200 to an external computing device (e.g., external computing device 600) (step 410). Method 400 also includes a bus switch (e.g., bus switch 270) in computing device 200 for determining if computing device 200 is active (step 420). If computing device 200 is active, method 400 includes bus switch 270 switching to a primary path for host to peer/peripheral communication with internal storage 230 (step 430).

If computing device 200 is not active, method 400 includes bus switch 270 switching to a secondary (or alternate) path for peer to host communication with internal storage 230 (step 440). Furthermore, method 400 includes internal storage 230 powering up utilizing power from external computing device 600 via an external bus interface (e.g., external bus interface 274) (step 450). As such, method 400 includes allowing external computing device 600 to access data in internal storage 230 (step 460).

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. Further, no element described herein is required for the practice of the invention unless expressly described as "essential" or "critical".

I claim:

1. A computing device; comprising:
   a bus switch;
   an internal storage;
   a primary bus coupled to the bus switch, wherein the primary bus provides a first path for accessing data stored in the internal storage; and
   a secondary bus coupled to the bus switch, wherein the secondary bus provides an auxiliary path independent from the first path to allow an external computing device access to data stored in the internal storage when the computing device is inactive, and the bus switch is configured to detect if the computing device is inactive and switch from the primary bus to the secondary bus to allow the external computing device access to the internal storage when the computing device is inactive.

2. The computing device of claim 1, further comprising:
   a port coupled to the secondary bus via the bus switch, wherein the port and the secondary bus allow the external computing device to access the internal storage via the auxiliary path when the external computing device is coupled to the port.

3. The computing device of claim 1, wherein the primary bus is one of a Peripheral Component Interconnect (PCI) bus, a PCI-Express bus, and a PCI-X bus.

4. The computing device of claim 2, wherein the port is one of a universal serial bus (USB) port and a FireWire port.

5. The computing device of claim 2, wherein the computing device is configured to allow the external device to directly access the internal storage via the port and the secondary bus.

6. The computing device of claim 2, wherein the internal storage receives power from the external device via the secondary bus.

7. A computing device, comprising:
   a bus switch;
   an internal storage;
   a primary bus coupled to the bus switch, wherein the primary bus is capable of accessing data stored in the internal storage;
   a secondary bus coupled to the bus switch, wherein the secondary bus is capable of accessing data stored in the internal storage, and the bus switch is configured to detect if the computing device is inactive and switch from the primary bus to the secondary bus access the internal storage when the computing device is inactive;
   a port coupled to the secondary bus via the bus switch, wherein the port and the secondary bus are configured to allow the external computing device to access the internal storage when the external computing device is coupled to the port, wherein the port is one of a universal serial bus (USB) port and a FireWire port; and
   wherein at least one of a Universal Serial Bus to Intelligent Drive Electronics (USB2IDE) adapter, a FireWire to Intelligent Drive Electronics (FireWire2IDE) adapter, a Personal Computer Memory Card International Association to Serial Advanced Technology Attachment (PCMCIA2SATA) adapter, and a Universal Serial Bus to Serial Advanced Technology Attachment (USB2SATA) adapter is in communication with the internal storage and one of the USB port and the FireWire port.

8. A computer-implemented method to retrieve data from an inactive host computer, comprising the steps of:
   providing in the host computer a primary bus and a secondary bus, each bus capable of accessing data stored in internal storage, the secondary bus providing an auxiliary path to allow an external computing device access to data when the host computer is inactive;
   determining, by a bus switch, if the host computer is inactive; and
   switching from the primary bus to the secondary bus to retrieve data from the internal storage of the host computer when the bus switch determines the host computer is inactive.

9. The computer-implemented method of claim 8, further comprising the step of:
   allowing the external computing device to access data in the internal storage when the host computer is inactive.

10. The computer-implemented method of claim 8, wherein the host computer is inactive when the host computer is one of malfunctioning and not receiving sufficient power to operate.

11. The computer-implemented method of claim 9, wherein access is allowing the external device to read data in the internal storage.

12. The computer-implemented method of claim 9, wherein access is allowing the external device to write data to the internal storage.

13. The computer-implemented method of claim 9, wherein access is allowing the external device to read and write data to the internal storage.

14. The computer-implemented method of claim 9, further comprising the step of:
   receiving power, by the internal storage, from the external device via the secondary bus when the external device is coupled to the host computer.

15. A system to retrieve data from an inactive computer, comprising:
   a first computing device comprising:
      a first port configured to couple the first computing device to an external computing device; and
   a second computing device comprising:
      a bus switch,
      an internal storage,
      a primary bus coupled to the bus switch, wherein the primary bus provides a first path for accessing data stored in the internal storage,
      a secondary bus coupled to the bus switch, wherein the secondary bus provides an auxiliary path independent from the first path to allow an external computing device access to data stored in the internal storage when the second computing device is inactive, and the bus switch is configured to detect if the computing device is inactive and switch from the primary bus to the secondary bus, and a second port in communication with the secondary bus via the bus switch, wherein the second port and the secondary bus allow the first computing device to access the internal storage via the auxiliary path when the first computing device is coupled to the second computing device.

16. The system of claim 15, wherein the first port and the second port are each one of a USB port and a FireWire port.

17. The system of claim 15, wherein the second computing device is configured to receive power from the first computing device when the second computing device is coupled to the first computing device and the second computing device is inactive.

18. The system of claim 15, wherein the first computing device and the second computing device are at least one of a personal computer, a laptop computer, a personal digital assistant (PDA), a Palm Pilot, a BlackBerry, a cellular telephone, a pager, a hand held computing device, a calculator, an MP3 player, and a video game system.

19. The system of claim 18, wherein the first computing device and the second computing device are different types of computing devices.

20. The system of claim 18, wherein the first computing device and the second computing device are the same type of computing device.

* * * * *